United States Patent [19]

Stein

[11] 4,161,759

[45] Jul. 17, 1979

[54] PROTECTION CIRCUIT FOR A VOLTAGE REGULATOR

[75] Inventor: Manfred Stein, Eschborn, Fed. Rep. of Germany

[73] Assignee: VDO Adolf Schindling AG, Frankfurt am Main, Fed. Rep. of Germany

[21] Appl. No.: 839,634

[22] Filed: Oct. 5, 1977

[30] Foreign Application Priority Data

Apr. 6, 1977 [DE] Fed. Rep. of Germany ....... 2715330

[51] Int. Cl.$^2$ ............................................. H02H 9/04

[52] U.S. Cl. .................................... 361/18; 323/22 T; 323/22 Z; 361/91

[58] Field of Search ....................... 361/18, 56, 90, 91, 361/111; 323/22 R, 22 T, 22 Z

[56] References Cited

U.S. PATENT DOCUMENTS

| | | | |
|---|---|---|---|
| 3,955,132 | 5/1976 | Greenwood | 361/18 X |
| 4,005,342 | 1/1977 | Davis | 361/56 X |
| 4,040,115 | 8/1977 | Gruson | 361/18 |

OTHER PUBLICATIONS

"IC Power Supply" Elektor Publishers Ltd. 2/77.

*Primary Examiner*—Harry E. Moose, Jr.
*Attorney, Agent, or Firm*—Martin A. Farber

[57] ABSTRACT

A protection circuit for a voltage regulator in integrated construction, particularly for motor vehicles, comprising a resistor in the ground connection line of the voltage regulator and a diode path between the voltage regulator-sided end of the same and the input of the voltage regulator and a unit for limiting the potential difference occurring on the resistor to a constant or a very small value in comparison to the output voltage.

7 Claims, 2 Drawing Figures

PROTECTION CIRCUIT FOR A VOLTAGE REGULATOR

Figure 1:
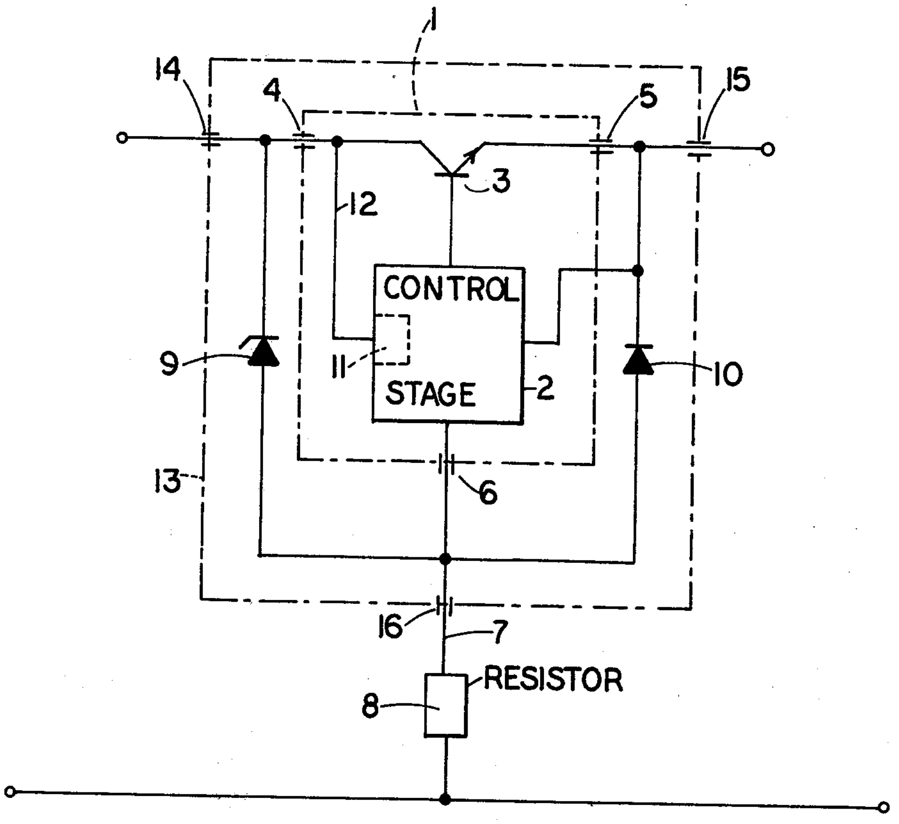

The invention relates to a protection circuit for a voltage regulator in integrated construction, particularly to such a circuit for motor vehicles.

Electronic voltage regulators in integrated construction frequently are used in motor vehicles for holding the operating voltage constant, which is required for the individual indicator instruments. They thereby control the supply voltage which can vary between 11 and 20 volts to a constant operating voltage, for example, of 10 volts, with which the indicator instruments are supplied. Since in the electrical power supply of the motor vehicle, by the switching off and switching on of loads, short-time voltage peaks up to 100 volts can occur, such type of a voltage regulator is subject to an increased danger of destruction by overvoltage or excessive transient surges.

It is an object of the present invention to provide measures by which the destruction of the voltage regulator by overvoltage is safely avoided. It is a further task and object of the invention to provide a safety protection circuit by which this aimed at purpose is achieved with the lowest possible expense.

This object is aided in its solution in accordance with the present invention in the manner that a resistor is provided in the ground connection line of the voltage regulator, and a diode path (9) is provided between the voltage regulator-sided end of the resistor and the voltage regulator input, and means are provided for limiting the potential difference occuring on the resistor to a constant or a very small value compared to the output voltage.

By these measures, due to the diode path, which in a preferred embodiment of the invention is formed as a Zener diode, it is achieved that the voltage regulator from time to time under the circumstances is admitted only with the maximum voltage predetermined by the diode path. If for example, in this manner the diode path is designed for a maximum voltage of 20 volts, in all cases thus voltage variations up to this magnitude could reach the regulator, however not the previously mentioned voltage peaks which can go far over such 20 volts. Since even during the normal operation, that is, when no voltage peaks occur, a voltage drop occurs on the resistor which lies in the ground connection line of the regulator, which resistor among other things is provided for current limitation for the diode path, a means must guarantee that this voltage drop is either always constant and thus can be taken into consideration in the output during the supplying of the indicator instruments, or that the voltage drop is so small in comparison with the controlled output voltage that it can be neglected. In this case conventional means can be used, whereby under circumstances this can be integrated directly in the voltage divider.

According to an additional concept of the invention, an additional diode is provided between the regulator-sided end of the resistor and the regulator output, such that the diode path and the additional diode form a current path in parallel to the regulator. Such a measure, which is effective particularly with the wiring of the regulator output with low-ohm loads, leads to a further reduction in the power dissapation or loss converted in the voltage regulator and consequently guarantees still improved protection against destruction. Beyond that, by these measures the regulator is protected against confusing the poles.

Beyond that, instead of this measure, or in addition to this, there can be provided means (11) determining or establishing the level of the input voltage, which upon exceeding of a certain predetermined voltage, triggers the transistor of the voltage regulator in the sense of a connecting-through, which transistor connects the regulator input to the regulator output. By this measure the power loss in the regulator can be reduced to a minimum and consequently the service reliability can be considerably increased. As the means (11) determining the level of the input voltage, conventional circuits can be provided, thus for example also a threshold value circuit. Beyond that, this means can be integrated in the regulator, whereby the costs therefor are guaranteed to be small.

With the above and other objects and advantages in view, the present invention will become more clearly understood in connection with the following detailed description of a preferred embodiment, when considered with the accompanying drawing, of which FIG. 1 illustrates a schematic protection circuit for a voltage regulator in the accordance with the present invention.

Figure 2:
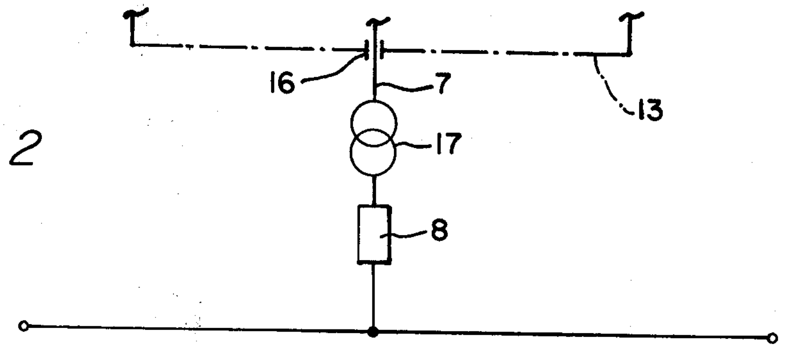

FIG. 2 is a broken-away portion of another embodiment of the schematic protection circuit.

Referring now to FIG. 1 of the drawing, the electronic voltage regulator 1 includes a control stage 2, which is not illustrated in further detail, which control stage 2 controls a transistor 3 connected thereto, which transistor 3 connects the input 4 of the voltage regulator 1 therethrough to the output 5 of the voltage regulator. The control stage 2 furthermore has a ground connection 6. The voltage regulator 1 is formed as an integrated circuit (IC).

In the ground connection line 7 of the voltage regulator 1, which line is connected to the ground connection 6, there is provided a resistor 8, which on the one hand is connected on its voltage regulator-sided end via a Zener diode 9 with the input 4 of the voltage regulator 1 and simultaneously on the other hand is connected at its same end via a diode 10 with the output 5 of the voltage regulator 1. Both the diodes 9 and 10 form a current path parallel to the voltage regulator 1.

In the control stage 2, furthermore, means 11 are provided which are not further detailed, which means, via a line 12 connected to the input 4 of the voltage regulator 1, ascertain the respective prevailing voltage there under the circumstances, and upon exceeding of a fixed predetermined voltage value, switches the transistor 3 into the open flow-through or conducting direction, thereby to connect-through the input 4 with the output 5 of the voltage regulator 1.

The Zener diode 9 as well as the diode 10 can be combined with the voltage regulator 1 into a single monolithic integrated circuit 13 with an input 14, an output 15 and a ground connection 16.

The structure of the control stage 2 is well known. Such control stage is distributed by the National Semiconducter Corp. under the specification No. LM 117.

Referring now to FIG. 2, a means for limiting the potential difference occuring on the resistor 8 to a constant value can be a source of constant current, which as illustrated is connected between the resistor 8 and the control stage 2 (the remainder of the circuit of FIG. 2 is the same as that of FIG. 1). This source can be monolithic integrated in the control stage 2. Such source of constant current as well as the integration method is well known to the persons skilled in the art.

The means 11 can be a zener diode which is connected to a point of the control stage 2 appropriate to control the transistor 3 into its conducting direction if the input voltage exceeds a predetermined value.

While there has been disclosed two embodiments of the invention, it is to be understood that these embodiments are given by example only and not in a limiting sense.

I claim:

1. A protection circuit for a voltage regulator in integrated construction, particularly for motor vehicles, comprising a voltage regulator having a ground connection line, an input and an output, a resistor connected in the ground connection line of said voltage regulator, and a diode path connected between a voltage regulator sided end of said resistor and said input of the voltage regulator, whereby said resistor having such a valve that the potential difference occurring on said resistor is limited to a very small value in comparison to the output voltage.

2. The protection circuit, as set forth in claim 1, wherein said diode path comprises a Zener diode.

3. The protection circuit, as set forth in claim 1, further comprising an additional diode disposed between the voltage regulator-sided end of said resistor and the output of said voltage regulator such that said diode path and said additional diode form a current path parallel to said voltage regulator.

4. The protection circuit, as set forth in claim 1, wherein said voltage regulator includes a transistor connecting said input of said voltage regulator to said output of said voltage controller, means for determining the level of the input voltage to said voltage regulator, and upon exceeding of a certain predetermined voltage for triggering said transistor in the sense of connecting-through said input to said output via said transistor.

5. The protection circuit as set forth in claim 4, wherein said transistor includes a base, an emitter and a collector, said voltage regulator includes a control stage, the latter includes said input voltage level determining means, said control stage includes leads connected to said base, said emitter and said collector, respectively.

6. The protection circuit as set forth in claim 5, wherein said input voltage level determining means constitutes a threshold value circuit.

7. A protection circuit for a voltage regulator in integrated construction, particularly for motor vehicles, comprising a voltage regulator having a ground connection line, an input and an output, a resistor connected in the ground connection line of said voltage regulator, a diode path connected between a voltage regulator-sided end of said resistor and said input of the voltage regulator, and a source of constant current in the resistor path limiting the potential difference occurring on said resistor to a constant value.

* * * * *